US008404174B2

(12) United States Patent
Nakanishi et al.

(10) Patent No.: US 8,404,174 B2
(45) Date of Patent: Mar. 26, 2013

(54) METHOD FOR PRODUCING CARBON NANOFIBER SUPPORTING METAL FINE PARTICLE

(75) Inventors: Haruyuki Nakanishi, Susono (JP); Hidekazu Arikawa, Susono (JP); Kazuya Uchisasai, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 229 days.

(21) Appl. No.: 12/743,541

(22) PCT Filed: Nov. 18, 2008

(86) PCT No.: PCT/JP2008/070931
§ 371 (c)(1),
(2), (4) Date: Oct. 1, 2010

(87) PCT Pub. No.: WO2009/069505
PCT Pub. Date: Jun. 4, 2009

(65) Prior Publication Data
US 2011/0012296 A1    Jan. 20, 2011

(30) Foreign Application Priority Data

Nov. 30, 2007    (JP) ................................. 2007-310550

(51) Int. Cl.
*D01D 9/14*    (2006.01)
*D01D 9/22*    (2006.01)
*D06M 10/00*    (2006.01)
*H05B 6/00*    (2006.01)
*H05B 7/00*    (2006.01)

(52) U.S. Cl. ........ 264/427; 264/29.2; 264/441; 264/465

(58) Field of Classification Search ................... 264/108, 264/427, 441, 464, 465, 466, 484, 29.2
See application file for complete search history.

(56) References Cited

U.S. PATENT DOCUMENTS

2007/0054580 A1    3/2007    Sakurai et al.
2007/0166464 A1*   7/2007    Acatay et al. ................. 427/346
(Continued)

FOREIGN PATENT DOCUMENTS

EP    1867762 B1    9/2008
JP    2006-274111 A    10/2006
(Continued)

OTHER PUBLICATIONS

Shen, Xinyuan, "Definition, Properties and Classification of Carbon Fiber" Advanced Polymeric Materials, China Textile & Appeal Press, p. 117 Feb. 28, 2006.

(Continued)

*Primary Examiner* — Leo B Tentoni
(74) *Attorney, Agent, or Firm* — Sughrue Mion, PLLC

(57) ABSTRACT

A main object of the present invention is to provide a method for producing a carbon nanofiber supporting a metal fine particle in which the metal fine particles are supported in high dispersion and sintering of the metal fine particles is restrained. The present invention attains the object by providing a method for producing a carbon nanofiber supporting a metal fine particle comprising a step of: spinning a material composition which contains a nitrogen-containing polymer, including a nitrogen element and capable of forming a carbon nanofiber, and an organometallic compound by an electro spinning process, and the spinning is conducted under a condition which keeps the nitrogen element remained to the carbon nanofiber and allows the formation of the carbon nanofiber.

6 Claims, 4 Drawing Sheets

U.S. PATENT DOCUMENTS

2009/0068461 A1* 3/2009 Reneker et al. ........... 264/484 X
2009/0152773 A1* 6/2009 Barinov et al. ............... 264/465

FOREIGN PATENT DOCUMENTS

| JP | 2007-515364 A |   | 6/2007 |
|----|---------------|---|--------|
| JP | 2010118269 A  | * | 5/2010 |
| WO | 2005/028719 A1 |  | 3/2005 |
| WO | 2005/044723 A2 |  | 5/2005 |
| WO | 2006/054636 A1 |  | 5/2006 |

OTHER PUBLICATIONS

Wang, Shihua, et al., "Preparation of Carbon Fiber" Course of Inorganic Chemistry, Science Press, p. 156, Sep. 30, 2000.

* cited by examiner

– HCN

– N2

METHOD FOR PRODUCING CARBON NANOFIBER SUPPORTING METAL FINE PARTICLE

CROSS REFERENCE TO RELATED APPLICATIONS

This application is a National Stage of International Application No. PCT/JP2008/070931 filed Nov. 18, 2008, claiming priority based on Japanese Patent Application No. 2007-310550 filed Nov. 30, 2007, the contents of all of which are incorporated herein by reference in their entirety.

TECHNICAL FIELD

The present invention relates to a method for producing a carbon nanofiber supporting a metal fine particle in which the metal fine particles are supported in high dispersion and sintering of the metal fine particles is restrained.

BACKGROUND ART

The usage environment for the alkaline fuel cell is alkaline-environment and is not a strong acidic environment unlike the proton-exchange membrane fuel cell. Accordingly, catalyst materials are unlikely to be corroded. Thus, the alkaline fuel cell has an advantage that it can use a nonnoble metal catalyst (such as Fe, Co, and Ni) therein. In the alkaline fuel cell, it is necessary to finely-dispersing the catalytic metal in nano-size and to stabilize them to enhance the catalyst characteristics.

Patent Document 1 discloses a method which comprises steps of: preparing a solution containing an organometallic compound mixed into a nitrogen-containing polymer (such as polyacrylonitrile); producing an organic metal-containing polymer fiber by an electro spinning process; and further, burning the fiber and producing a carbon nanofiber supporting a metal fine particle. In this method, it is possible to obtain a carbon nanofiber supporting a metal fine particle which has the metal fine particles supported in high dispersion. Further, the Patent Document 1 discloses that it is possible to use the obtained carbon nanofiber supporting a metal fine particle for a fuel cell.

Patent Document 1: Japanese Patent Application Laid-Open (JP-A) No. 2007-515364
Patent Document 2: WO 2005/028719

DISCLOSURE OF THE INVENTION

Problems to be Solved by the Invention

However, the method disclosed in the Patent Document 1 conducts burning process further after the electro spinning process. Accordingly, the nitrogen-containing polymer (such as polyacrylonitrile) used as the material is completely carbonized and the metal fine particles are made into a state where the fine particles are simply supported on the carbon nanofiber. As such, grain growth (sintering) in the metal fine particles is easily caused in high-temperature environment and problems such as deterioration in catalyst function are raised.

The present invention was attained in view of the above-mentioned situation and a main object thereof is to provide a method for producing a carbon nanofiber supporting a metal fine particle in which the metal fine particles are supported in high dispersion and sintering of the metal fine particles is restrained.

Means for Solving the Problem

To attain the object, the present invention provides a method for producing a carbon nanofiber supporting a metal fine particle comprising a step of: spinning a material composition which contains a nitrogen-containing polymer, including a nitrogen element and capable of forming a carboon nanofiber, and an organometallic compound by an electro spinning process, and the spinning is conducted under a condition which keeps the nitrogen element remained to the carbon nanofiber and allows the formation of the carbon nanofiber.

In the present invention, by keeping the nitrogen element remained to the carbon nanofiber, it is possible to coordinate the nitrogen element: to the metal fine particle. Thereby, binding between the metal fine particle and the carbon nanofiber becomes stronger compare to the case where the metal fine particles are simply supported on the carbon nanofiber. As a result, it becomes possible to restrain the sintering of the metal fine particles.

In the present invention, the nitrogen-containing polymer is preferably polyacrylonitrile. Thereby, formation of a carbon nanotube becomes easy.

In the present invention, it is preferable that a plurality of metal complexes having different central metals are used as the organometallic compound. Thereby, a carbon nanofiber supporting a metal fine particle having different metal fine particles highly-dispersed is obtained.

In the present invention, the plurality of metal complexes are preferably a Fe-containing complex, a Ni-containing complex, and a Co-containing complex. Thereby, it becomes possible to obtain a carbon nanofiber supporting a metal fine particle which exhibits a useful catalyst function in a direct ethanol alkaline fuel cell for example. In the present invention, it is preferable that a magnetic susceptibility of each central metal of the plural metal complexes is different and a magnetic field is applied in a direction crossing to an injection direction of the material composition. By applying a voltage to the magnetic field, the metal fine particles formed by the metal complex are provided according to the magnetic susceptibility of each metal, and it becomes possible to obtain a carbon nanofiber supporting a metal fine particle having plural metal fine particles arranged regularly.

Effect of the Invention

The present invention attains an effect of providing a carbon nanofiber supporting a metal fine particle in which the metal fine particles are supported in high dispersion and sintering of the metal fine particles is restrained.

DESCRIPTION OF REFERENCE NUMERALS

Figure 1:
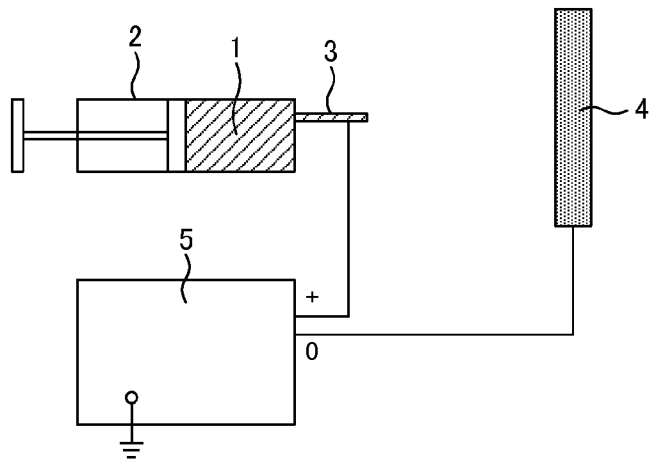
FIG. 1 is an explanatory diagram explaining one embodiment of the method for producing a carbon nanofiber supporting a metal fine particle of the present invention.

1 Material composition
2 Syringe
3 Nozzle
4 Collector
5 High-voltage generator

BEST MODE FOR CARRYING OUT THE INVENTION

Hereinafter, the method for producing a carbon nanofiber supporting a metal fine particle of the present invention will be explained in detail.

A method for producing a carbon nanofiber supporting a metal fine particle of the present invention comprises a step of: spinning a material composition which contains a nitrogen-containing polymer, including a nitrogen element and capable of forming a carbon nanofiber, and an organometallic compound by an electro spinning process, and the spinning is conducted under a condition which keeps the nitrogen element remained to the carbon nanofiber and allows the formation of the carbon nanofiber.

In the present invention, by keeping the nitrogen element remained to the carbon nanofiber, it is possible to coordinate the nitrogen element to the metal fine particle. Thereby, binding between the metal fine particle and the carbon nanofiber becomes stronger compare to the case where the metal fine particles are simply supported on the carbon nanofiber. As a result, it becomes possible to restrain the sintering of the metal fine particles. Further, since the present invention employs the electro spinning process, it is possible to obtain a carbon nanofiber supporting a metal fine particle in which the metal fine particles are highly-dispersed in nanosize.

Conventionally, a burning process is carried out further after an electro spinning process to increase crystalline properties of a carbon nanofiber. This is to avoid a nitrogen element remaining to a carbon nanofiber because it is not preferable from viewpoints such as electron conductivity. In other words, a carbon nanofiber with a nitrogen element remained has been considered as a defective product. On the contrary, in the present invention, the nitrogen element is positively kept remained to the carbon nanofiber, and thereby, binding between the metal fine particle and the carbon nanofiber is made strong. As a result, it is made possible to restrain the sintering of the metal fine particles.

Further, when a metal fine particle is used as a catalyst for example, it is assumed that the metal fine particle surface is oxidized by contacting to oxygen and the catalyst function thereof is lowered. In the present invention, by coordinating the nitrogen element remained to the carbon nanofiber to the metal fine particle, it becomes difficult to oxidize the metal fine particle surface and becomes possible to restrain the lowering of the catalyst function. Further, since it is possible to use an organometallic compound containing elements such as iron, nickel and cobalt in the present invention, it is possible to produce a catalyst for a fuel cell and the like at low cost. Moreover, since the carbon nanofiber is generally excellent in its strength, elasticity, and electron conductivity, it is particularly useful for an application to a fuel cell and the like.

FIG. 1 is an explanatory diagram explaining one embodiment of the method for producing a carbon nanofiber supporting a metal fine particle of the present invention. In FIG. 1, a material composition 1 comprising a nitrogen-containing polymer (such as polyacrylonitrile), an organometallic compound (such as iron(III)acetylacetonate, nickel(II)acetylacetonate, and cobalt(III)acetylacetonate), and a solvent (such as N, N-dimethylformamide) is prepared first and filled into a syringe 2. A nozzle 3 of the syringe 2 and a collector 4 are each connected to a high-voltage generator 5 so that it is possible to apply the predetermined voltage thereto. Next, the material composition 1 is injected from the syringe 2 while applying the predetermined voltage. Thereby, the material composition 1 injected from the syringe 2 is instantly heated to high temperature and the nitrogen-containing polymer contained in the material composition 1 becomes a carbon nanofiber. At that point, in the present invention, the nitrogen element remains to the carbon nanofiber and a spinning is conducted under a condition which allows the formation of the carbon nanofiber.

Figure 2A:
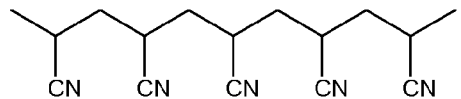
FIGS. 2A to 2D are an explanatory diagram explaining the chemical reaction of forming the carbon nanofiber from polyacrylonitrile.
Figure 2B:
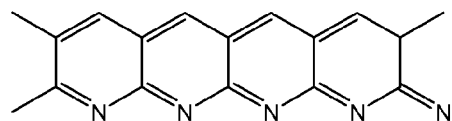
Figure 2C:
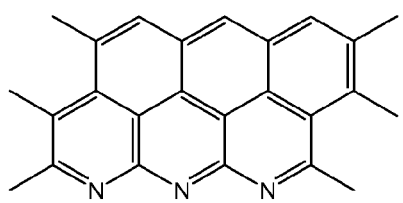
Figure 2D:
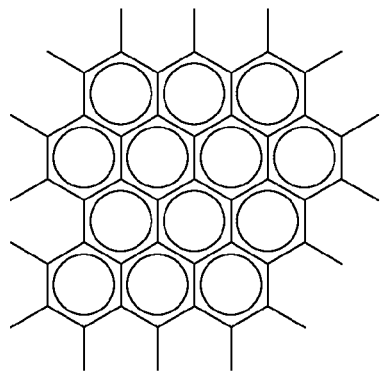

FIGS. 2A to 2D are an explanatory diagram explaining the chemical reaction of forming a carbon nanofiber from polyacrylonitrile. Polyacrylonitrile (FIG. 2A) is condensed by heating and a hetero ring structure is formed (FIG. 2B). Condensation reaction is further progressed by a longer heating (FIG. 2C) and a carbon nanofiber having no nitrogen element is obtained eventually (FIG. 2D). In the present invention, the nitrogen element remains to the carbon nanofiber and a spinning is conducted under a condition which allows the formation of the carbon nanofiber. Thereby, the carbon nanofiber supporting a metal fine particle obtained becomes a carbon nonofiber in which thus remained nitrogen element is coordinated to the metal fine particle. By making a binding between the nitrogen element and metal, it becomes possible to obtain the carbon nanofiber supporting a metal fine particle which restrains the sintering of the metal fine particles.

In the present invention, the term "carbon nanofiber" denotes a fibrous carbon having a nano order diameter and a carbon nanotube is included therein.

Hereinafter, each steps of the present invention will be explained.

1. Spinning Step

A spinning step in the present invention is a step of spinning a material composition which contains a nitrogen-containing polymer, including a nitrogen element and capable of forming a carbon nanofiber, and an organometallic compound by an electro spinning process, and the spinning is conducted under a condition which keeps the nitrogen element remained to the carbon nanofiber and allows the formation of the carbon nanofiber.

(1) Material Composition

First, a material composition used in the present invention will be explained. The material composition used in the present invention normally contains a nitrogen-containing polymer, an organometallic compound, and a solvent.

The nitrogen-containing polymer is not particularly limited as long as it is a polymer which includes a nitrogen element and capable of forming a carbon nanofiber. Generally, a polymer which is condensed by heating and capable of forming a hetero ring structure is regarded as a polymer capable of forming a carbon nanofiber. As examples of the nitrogen-containing polymer, mentioned can be made of polyacrylonitrile, poly(acrylonitrile-acrylic acid), poly(acrylonitrile-butadiene), and polystyrene·polyamic acid. Among them, polyacrylonitrile is preferable.

The average molecular weight of the nitrogen-containing polymer is not particularly limited as long as the polymer is capable of forming a carbon nanofiber. For example, when the nitrogen-containing polymer is polyacrylonitrile, the weight-average molecular weight Mw is preferably within the range of 8,000 to 13,000.

A concentration of the nitrogen-containing polymer of the material composition is preferably within the range of 50 vol % to 80 vol % for example. It becomes possible to effectively form a carbon nanofiber if the concentration is within the above-mentioned range.

On the other hand, the organometallic compound used for the material composition is not particularly limited as long as it is a compound which can form metal fine particles by the electro spinning process. In particular, the organometallic compound is preferably a metal complex in the present invention. As examples of the metal complex, mention can be made of a transition metal-based complex such as a Fe-containing complex, a Ni-containing complex, a Co-containing complex, a Mn-containing complex, a Mo-containing complex, Cu-containing complex, a Cr-containing complex; and a noble metal-based complex such as a Pt-containing complex, a Pd-containing complex, a Rh-containing complex, a Ru-containing complex, a Au-containing complex, and a Ag-containing complex.

As an example of the Fe-containing complex, substance such as iron (III) acetylacetonate is specifically cited. As an example of the Ni-containing complex, substance such as nickel(II)acetylacetonate is specifically cited. As an example of the Co-containing complex, substance such as cobalt(III) acetylacetonate is specifically cited.

In the present invention, the material composition may contain a single organometallic compound or plural organometallic compounds. When the material composition contains plural metal complexes, each central metal of the plural metal complexes may be the same or different. In particular, it is preferable in the present invention to use a plurality of metal complexes having different central metals. Thereby, it becomes possible to obtain a carbon nanofiber supporting a metal fine particle in which different metal fine particles are highly-dispersed. By interactions of different metal fine particles, a carbon nanofiber supporting a metal fine particle having an improved catalyst function can be obtained for example.

When the material composition contains a plurality of metal complexes, the plurality of metal complexes are preferably a Fe-containing complex, a Ni-containing complex, and a Co-containing complex. Thereby, for example, it becomes possible to obtain a carbon nanofiber supporting a metal fine particle exhibiting useful catalyst function for a direct ethanol alkaline fuel cell.

A concentration of the (single) organometallic compound of the material composition is preferably within the range of 5 wt % to 30 wt % for example. When the concentration is within the above-mentioned range, it becomes possible to obtain a carbon nanofiber supporting a metal fine particle having metal fine particles further highly-dispersed.

Further, a solvent used in the material composition is not particularly limited as long as it is a solvent which is capable of dispersing the nitrogen-containing polymer and organometallic compound. As specific examples of the solvent, mention can be made of acetone, chloroform, ethanol, isopropanol, methanol, toluene, tetrahydrofuran, water, benzene, benzyl alcohol, 1,4 dioxane, propanol, methylene chloride, carbon tetrachloride, cyclohexane, cyclohexanone, phenol, pyridine, trichloroethane, acetic acid, N,N-dimethylformamide, acetonitrile, N-methylmorpholine-N-oxide, 1,3-dioxolan, and methyl ethyl ketone.

The material composition is formed, for example, by mixing the nitrogen-containing polymer, the organometallic compound(s), and a solvent, and stirring the mixture. A stirring time is not particularly limited as long as it is possible to obtain a uniform material composition. For example, it is preferably within the range of 24 to 100 hours.

(2) Spinning Condition

Next, spinning conditions for the present invention will be explained. In the present invention, the spinning of the material composition is conducted by an electro spinning process under a condition which keeps the nitrogen element remained to the carbon nanofiber and allows the formation of the carbon nanofiber. In general, the electro spinning process is a method in which a high voltage is applied to a material composition and the same is injected to form a nanofiber.

In the present invention, the carbon nanofiber supporting metal fine particle does not always need to have high crystalline properties. In the present invention, it is regarded as being possible to form the carbon nanofiber as long as a carbon nanofiber, which can exhibit the desired electron conductivity, is obtained.

In the present invention, an apparatus to inject the material composition is not particularly limited as long as it is an apparatus which can inject the material composition from a nozzle of a small diameter. A diameter of the nozzle is preferably within the range of 10 μm to 300 μm for example. When the diameter of the nozzle is too large, there arises a possibility in failing to generate a uniform condensation reaction, and when the diameter of the nozzle is too small, there arises a possibility to cause clogging.

A feeding rate of injecting the material composition from the nozzle is preferably within the range of 0.05 ml/m to 0.3 ml/m for example. As long as the feeding rate is within the above-mentioned range, it is possible to obtain a carbon nanofiber supporting a metal fine particle having the metal fine particle further highly dispersed.

A distance between the tip of the nozzle to the collector is preferably within the range of 5 cm to 50 cm for example. As long as the distance is within the above-mentioned range, it is possible to obtain a carbon nanofiber supporting a metal fine particle having the metal fine particle further highly dispersed. Further, a direction to inject the material composition from the nozzle is not particularly limited and the direction may be vertical to or may have the predetermined angle to the collector surface.

In the t present invention, the material composition is injected in a state where the predetermined voltage is applied between the nozzle and the collector. A strength of the electric filed applied is preferably within the range of 1 kV/cm to 3 kV/cm for example. The electro spinning process does not depend on a direction of the electric field as long as it is possible to form an electric field between the nozzle and the collector. Thus, the collector may be grounded or the nozzle may be grounded.

Further, an atmosphere in injecting the material composition is not particularly limited in the present invention. It may be under an oxygen atmosphere or an inert gas atmosphere.

Figure 3:
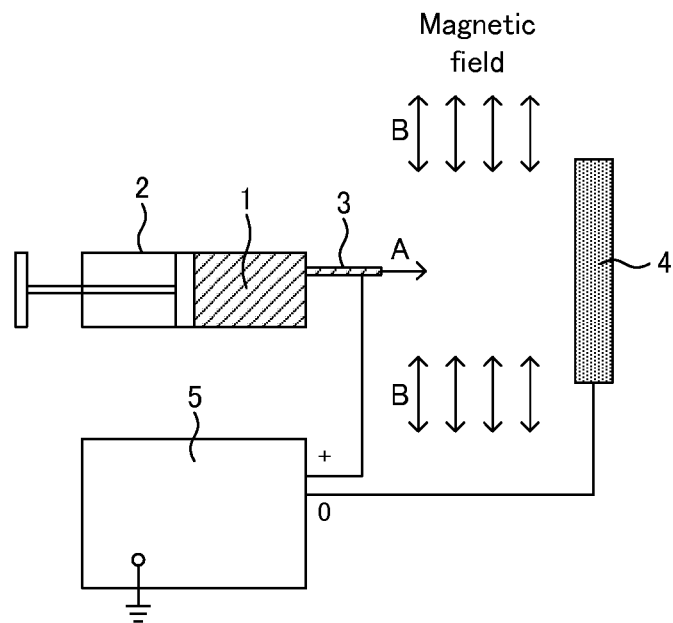
FIG. 3 is an explanatory diagram explaining another embodiment of the method for producing a carbon nanofiber supporting a metal fine particle of the present invention.

In the present invention, it is preferable that a magnetic susceptibility of each central metal of the plural metal complexes is different and a magnetic field is applied in a direction crossing to an injection direction of the material composition. By applying a voltage to the magnetic the metal fine particles formed by the metal complex are provided according to the magnetic susceptibility of each metal, and it becomes possible to obtain a carbon nanofiber supporting a metal fine particle having plural metal fine particles arranged regularly. Specifically, as shown in FIG. 3, a material composition 1 containing a nitrogen-containing polymer, an crganometallic compound, and a solvent is filled in a syringe and the predetermined voltage is applied thereto by a high-voltage generator 5. Further, the magnetic field is applied in a direction B which crosses to a direction A, that is the direction of injecting the material composition 1 out of the nozzle 3 of the syringe 2. Thereby, it is possible to obtain a carbon nanofiber supporting a metal fine particle having plural metal fine particles arranged regularly.

Figure 4:
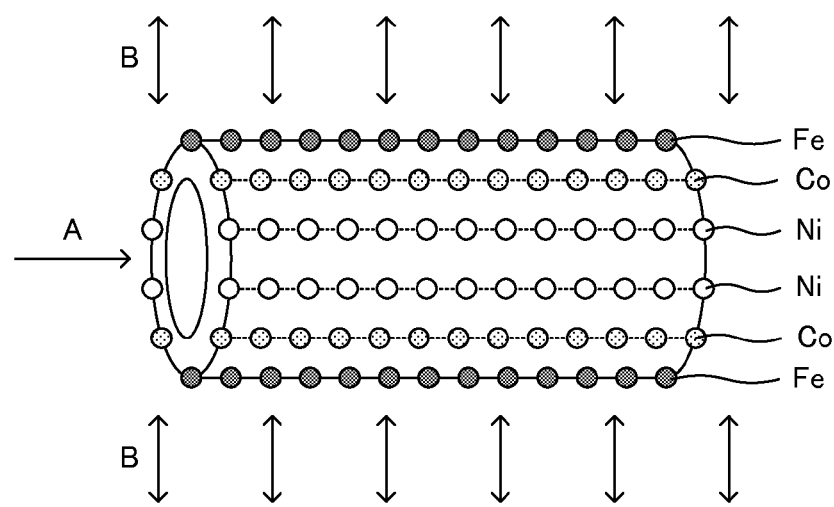
FIG. 4 is an explanatory diagram explaining the carbon nanofiber supporting a metal fine particle formed when the predetermined magnetic field is applied using a Fe-containing complex, a Ni-containing complex, and a Co-containing complex.

FIG. 4 is an explanatory diagram explaining the carbon nanofiber supporting a metal fine particle formed when the predetermined magnetic field is applied using a Fe-containing complex, a Ni-containing complex, and a Co-containing complex. The respective magnetic susceptibility of each central metal satisfies the relation: $Fe^{+3} > Co^{+3} > Ni^{+3}$. Thus, as shown in FIG. 4, Fe, which has the largest magnetic susceptibility, moves most along the magnetization direction B; Ni, which has the smallest magnetic susceptibility moves least along the magnetzatation direction B; and Co, which has the medium magnetic susceptibility, moves to the position about in the between Fe and Ni. Thereby, it becomes possible to obtain a carbon nanofiber supporting a metal fine particle having each metal fine particles of Fe, Co, and Ni arranged regularly.

Figure 5A:
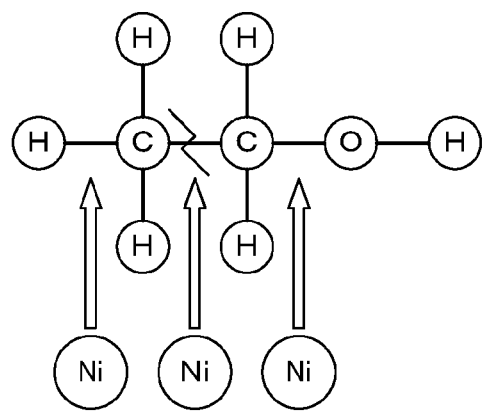
FIGS. 5A and 5B are an explanatory diagram explaining oxidation of ethanol.
Figure 5B:
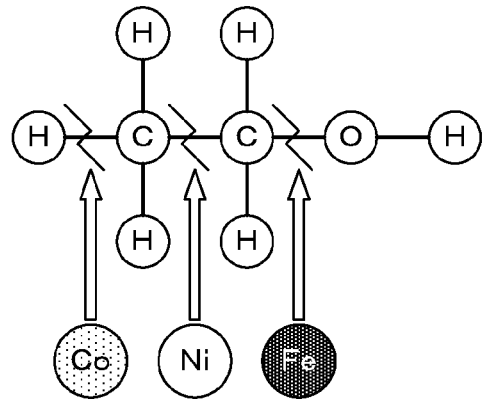

The carbon nanofiber supporting a metal fine particle having each metal fine particles of Fe, Co, and Ni arranged regularly can exhibit useful catalyst function by applying to, for example, a direct ethanolalkaline fuel cell. The reaction mechanism of the catalyst in the anode side of the direct ethanolalkaline fuel cell is not yet clarified, but it is thought mainly that Ni cuts the C—C bond off, Co cuts the C—H bond off, and Fe plays an important role in cutting the C—O bound. Here, when each metal fine particle of Fe, Co, and Ni are randomly aligned conventionally, the alignment of the metal catalyst is not suitable in cutting the various bonds. Specifically, as shown in FIG. 5A, oxidation of ethanol cannot be performed effectively at the portion where the Ni metal fine particles are dense. In contrast, when each metal fine particle of Fe, Co, and Ni are aligned regularly, the alignment of the metal catalyst is suitable in cutting the various bonds as shown in FIG. 5B so that it is possible to effectively perform the oxidation of ethanol.

A direction to apply the magnetic field is not particularly limited as long as it is a direction crossing to the injection direction of the material composition. In particular, the direction is preferably a direction which is orthogonal to the injection direction of the material composition. Thereby, the metal fine particles are aligned regularly along the diameter direction of the carbon nanofiber. Further, it is preferable that a strength of the magnetic field applied is appropriately selected according to a factor such as a composition of the material composition. The place to apply the magnetic field is normally between the part where the material composition is to be injected and the collector. Further, in the present invention, the magnetic susceptibility of each central metal of the plural metal complexes is preferably different to the extent that it effects the alignment of the metal fine particles.

2. Burning Step

In the present invention, a burning step may be conducted after the above-mentioned spinning step. In the present invention, it is possible to sufficiently carbonize the material composition by suitably adjusting factors such as a strength of the electric field at the time of the electro spinning process in the spinning step. However, when the carbonization is insufficient in the spinning step for example, the amount of the nitrogen element remained to the carbon nanofiber may be adjusted by conducting the burning step and thereby re-progressing the condensation reaction. Similarly to the above-mentioned spinning step, it is necessary for the burning step in the present invention to conduct the step under a condition which keeps the nitrogen element remained to the carbon nanofiber and allows the formation of the carbon nanofiber.

A burning method is similar to the burning method employed in producing a general carbon nanofiber and a method of using a baking furnace is specifically cited. A burning temperature is not particularly limited as long as it is a temperature which progresses a condensation reaction of the target. For example, it is preferably within the range of 180° C. to 300° C. Further, the burning step is generally conducted under an atmosphere which does not contain oxygen substantially. This is to prevent the lost of carbon. An oxygen density to conduct the burning step is, for example, preferably 20 ppm or lower and more preferably 10 ppm or lower. In general, burning is conducted while circulating an inert gas such as nitrogen or argon gas.

3. Carbon Nanofiber Supporting a Metal Fine Particle

Next, a carbon nanofiber supporting a metal fine particle obtained in the present invention will be explained. The carbon nanofiber supporting a metal fine particle obtained in the present invention comprises a carbon nanofiber having a nitrogen element remained and a metal fine particle forming a coordinate bond with the nitrogen element.

A diameter of the carbon nanofiber is preferably within the range of 1 nm to 100 nm for example. Further, a length of the carbon nanofiber is preferably 10 µm or longer for example.

A diameter of the metal fine particle supported on the carbon nanofiber is not particularly limited. It is preferably within the range of 0.1 nm to 100 nm for example.

Further, as an example of the application of the carbon nanofiber supporting a metal fine particle, usage as a catalyst is cited. When the carbon nanofiber supporting a metal fine particle is used as a catalyst, the catalyst can be further used, for example, for a fuel cell. In particular, it is preferable to use the catalyst for an alkaline fuel cell.

The present invention is not limited to the above embodiments. The embodiments are illustrations and any variations and modifications which have the substantially same structure as the technical idea described in claims of the present invention and achieve the same operation effect are encompassed in the technical scope of the present invention.

EXAMPLES

Hereinafter, the present invention will be further specifically explained by way of examples.

Example 1

Mixed for 48 hours were polyacrylonitrile (PAN, weight-average molecular weight Mw 84500, manufactured by Sigma-Aldrich Japan K.K.) of 7 parts by weight which is a nitrogen-containing polymer, iron(III)acetylacetonate (manufactured by Sigma-Aldrich Japan K.K.) of 5 parts by weight which is a Fe-containing complex, nickel(II)acetylacetonate (manufactured by Sigma-Aldrich Japan K.K.) of 5 parts by weight which is a Ni-containing complex, cobalt(III) acetylacetonate (manufactured by Sigma-Aldrich Japan K.K.) of 5 parts by weight which is a Co-containing complex, and N,N-dimethylformamide (manufactured by Sigma-Aldrich Japan K.K.) of 90 parts by weight which is a solvent. Thereby, a material composition was produced.

The obtained material composition was spun by an electro spinning process using an apparatus illustrated in FIG. 1. At this time, an inner diameter of the nozzle was 50 μm, a distance between the nozzle and the collector was 30 cm, a strength of an electric field was 2 kV/cm, and a feeding rate was 0.1 ml/m. Afterwards, thus obtained nanofiber was firstly dried in air at 60° C. for 2 hours, and heated under nitrogen atmosphere at a temperature range of 180° C. to 300° C. for 16 hours. A carbon nanofiber supporting a metal fine particle was thereby obtained.

Comparative Example 1

The carbon nanofiber supporting a metal fine particle obtained in Example 1 was further heated under nitrogen atmosphere at a temperature range of 1100° C. to 2000° C. for 2 hours and thereby a carbon nanofiber supporting a metal fine particle of Comparative Example 1 was obtained.

[Evaluation 1]

Figure 6:
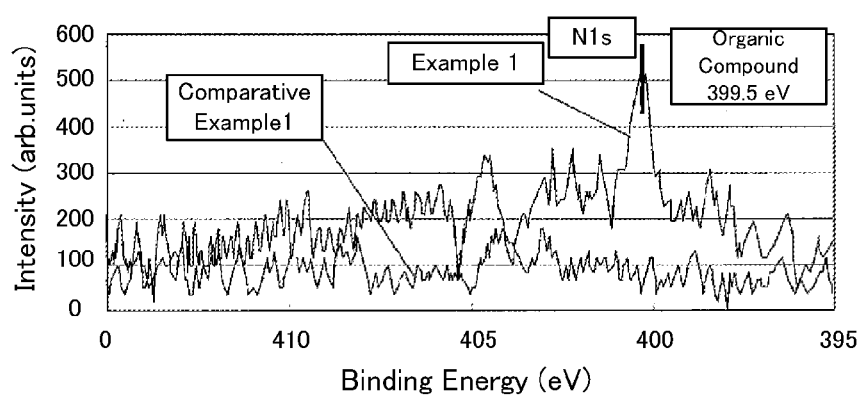
FIG. 6 is a graph showing the results of XPS analysis made on the carbon nanofibers supporting metal fine particles obtained in Example 1 and Comparative Example 1.

The carbon nanofiber supporting a metal fine particles obtained in Example 1 and Comparative Example 1 were measured with an X ray photoelectron spectrometry (XPS) apparatus. The results are shown in FIG. 6. As illustrated in FIG. 6, it was confirmed that the carbon nanofiber supporting a metal fine particle obtained in Example 1 showed a peak representing the presence of nitrogen element and that the nitrogen element of the nitrogen-containing polymer, which was the material, remained to the carbon nanofiber. On the other hand, it was confirmed that the carbon nanofiber supporting a metal fine particle obtained in Comparative Example 1 did not show a peak representing the presence of nitrogen element and that the nitrogen-containing polymer, which was the material, was completely carbonized.

Example 2

Using the carbon nanofiber supporting a metal fine particle obtained in Example 1, an alkaline fuel cell was produced. The carbon nanofiber supporting a metal fine particle of 0.5 g obtained in Example 1 was dispersed into water of about 10 ml, thus obtained catalyst dispersion liquid was coated on a porous sheet made of nickel (nickel form, about 1 mm thickness) (36 mm square, 0.3 mm), and the resultant was dried to prepare an anode electrode (0.3 mm thickness). On the other hand, the carbon nanofiber supporting a metal fine particle obtained in Example 1 of 0.5 g was dispersed together with tetrafluoroethylene of 0.05 g into water of about 10 ml by an ultrasonic dispersion, thus obtained catalyst dispersion liquid was spray-coated on a porous sheet made of carbon (carbon sheet, about 1 mm thickness) (36 mm square, 0.2 mm), and the resultant was dried to prepare a cathode electrode. Next, an anionic exchange membrane (hydrocarbon-based membrane, 40 μm film thickness, 65 mm square) was sandwiched between the anode electrode and the cathode electrode in such a manner that the membrane contacted to the respective catalyst dispersion liquid-coated surfaces of the anode electrode and the cathode electrode. The resultant was placed to a cell jig to prepare an alkaline fuel cell.

Comparative Example 2

An alkaline fuel cell was produced in the same manner as in Example 2 except that the carbon nanofiber supporting a metal fine particle obtained in Comparative Example 1 was used.

[Evaluation 2]

The I-V properties of the alkaline fuel cells obtained in Example 2 and Comparative Example 2 were measured by galvanostat under the following conditions. Results are shown in FIG. 7.

<I-V Properties Measuring Conditions>

Anode fuel: KOH ethanol aqueous solution (ethanol 10 wt %, KOH 1M)
Anode fuel flow: about 600 ml/min
Cathode gas: air
Cathode gas flow: 130 ml/min
Temperature (thermostat bath temperature): 50° C.

Figure 7:
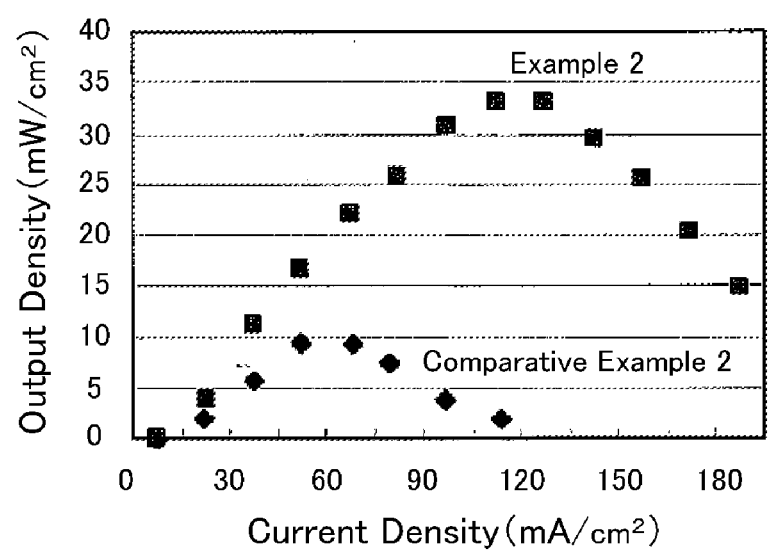
FIG. 7 is a graph showing the results of I-V properties of the alkaline fuel cells obtained in Example 2 and Comparative Example 2.

As shown in FIG. 7, it was confirmed that the output density of the alkaline fuel cell of Example 2 showed a substantial improvement compare to that of the alkaline fuel cell of Comparative Example 2.

The invention claimed is:

1. A method for producing a carbon nanofiber supporting a metal fine particle comprising:
    spinning a material composition which contains a nitrogen-containing polymer, including a nitrogen element and capable of forming a carbon nanofiber, and a metal complex by an electro spinning process; and
    burning the fiber obtained in the carbon nanofilter obtained in the spinning step while keeping the nitrogen element remained to the carbon nanofiber,
    wherein the nitrogen element constitutes a hetero ring structure.

2. The method for producing a carbon nanofiber supporting a metal fine particle according to claim 1, wherein the nitrogen-containing polymer is polyacrylonitrile.

3. The method for producing a carbon nanofiber supporting a metal fine particle according to claim 1, wherein a plurality of metal complex having different central metals are used as the metal complex.

4. The method for producing a carbon nanofiber supporting a metal fine particle according to claim 3, wherein the plurality of metal complex are a Fe-containing complex, a Ni-containing complex, and a Co-containing complex.

5. The method for producing a carbon nanofiber supporting a metal fine particle according to claim 3, wherein a magnetic susceptibility of each central metal of the plural metal complexes is different and a magnetic field is applied in a direction crossing to an injection direction of the material composition.

6. The method for producing a carbon nanofiber supporting a metal fine particle according to claim 4, wherein a magnetic susceptibility of each central metal of the plural metal complexes is different and a magnetic field is applied in a direction crossing to an injection direction of the material composition.

* * * * *